(12) United States Patent
Benthaus et al.

(10) Patent No.: US 10,563,680 B2
(45) Date of Patent: Feb. 18, 2020

(54) DAMPENED FASTENER ASSEMBLY

(71) Applicant: Lear Corporation, Southfield, MI (US)

(72) Inventors: Dirk Benthaus, Boeblingen (DE); Zvonko Van Der Meer, Sindelfingen (DE)

(73) Assignee: Lear Corporation, Southfield, MI (US)

( * ) Notice: Subject to any disclaimer, the term of this patent is extended or adjusted under 35 U.S.C. 154(b) by 183 days.

(21) Appl. No.: 15/729,903

(22) Filed: Oct. 11, 2017

(65) Prior Publication Data

US 2018/0180074 A1 Jun. 28, 2018

(30) Foreign Application Priority Data

Dec. 23, 2016 (DE) .................... 20 2016 107 350 U

(51) Int. Cl.
*F16B 1/02* (2006.01)
*F16B 39/28* (2006.01)
*F16F 7/12* (2006.01)

(52) U.S. Cl.
CPC ................ *F16B 1/02* (2013.01); *F16B 39/28* (2013.01); *F16F 7/12* (2013.01)

(58) Field of Classification Search
CPC ........ F16B 1/02; F16B 5/0241; F16B 5/0657; F16B 39/28
USPC ........................................ 411/103, 104, 105
See application file for complete search history.

(56) References Cited

U.S. PATENT DOCUMENTS

| | | | | |
|---|---|---|---|---|
| 2,026,757 A | * | 1/1936 | Swanstrom | B23P 19/062 411/180 |
| 2,326,681 A | * | 8/1943 | Richardson | F16B 39/34 411/303 |
| 2,348,308 A | * | 5/1944 | Richardson | F16B 39/34 411/303 |
| 2,477,429 A | * | 7/1949 | Swanstrom | F16B 37/044 411/104 |
| 2,742,938 A | * | 4/1956 | Neuschotz | F16B 39/06 411/270 |
| 3,434,261 A | * | 3/1969 | Rohe | F16B 5/01 411/116 |
| 3,621,557 A | * | 11/1971 | Cushman et al. | B64C 1/12 29/460 |
| 3,765,464 A | * | 10/1973 | Hasegawa | F16B 37/044 411/108 |

(Continued)

FOREIGN PATENT DOCUMENTS

| | | |
|---|---|---|
| CN | 201843748 U | 5/2011 |
| DE | 3842351 A1 | 6/1990 |

(Continued)

*Primary Examiner* — Roberta S Delisle
(74) *Attorney, Agent, or Firm* — Brooks Kushman P.C.

(57) ABSTRACT

A fastener assembly is provided with a first threaded fastener. A damper has a body sized to receive the first threaded fastener, and a flange to provide an installation surface. A second threaded fastener is sized to engage the first threaded fastener. An actuator includes a housing with a receptacle. The receptacle has a cavity sized to receive the flange of the damper, and the receptacle is provided with a slot with an opening to receive the body of the damper. A structural support member has an aperture formed therethrough. The second threaded fastener is engaged with the aperture of the structural support member to fasten the actuator to the structural support member.

20 Claims, 4 Drawing Sheets

(56) References Cited

U.S. PATENT DOCUMENTS

| | | | | |
|---|---|---|---|---|
| 4,883,399 A | * | 11/1989 | MacLean | F16B 33/006 |
| | | | | 411/431 |
| 4,887,950 A | * | 12/1989 | Sakayori | B29C 33/123 |
| | | | | 411/302 |
| 5,090,854 A | | 2/1992 | Hafeli et al. | |
| 5,156,507 A | * | 10/1992 | Underbrink | F16B 13/066 |
| | | | | 411/63 |
| 5,266,258 A | * | 11/1993 | Martin | B29C 65/44 |
| | | | | 264/249 |
| 9,118,050 B2 | | 8/2015 | Byun et al. | |
| 2004/0115030 A1 | | 6/2004 | Schwarz et al. | |

FOREIGN PATENT DOCUMENTS

| | | |
|---|---|---|
| GB | 907263 | 10/1962 |
| JP | H10267024 A | 10/1998 |

\* cited by examiner

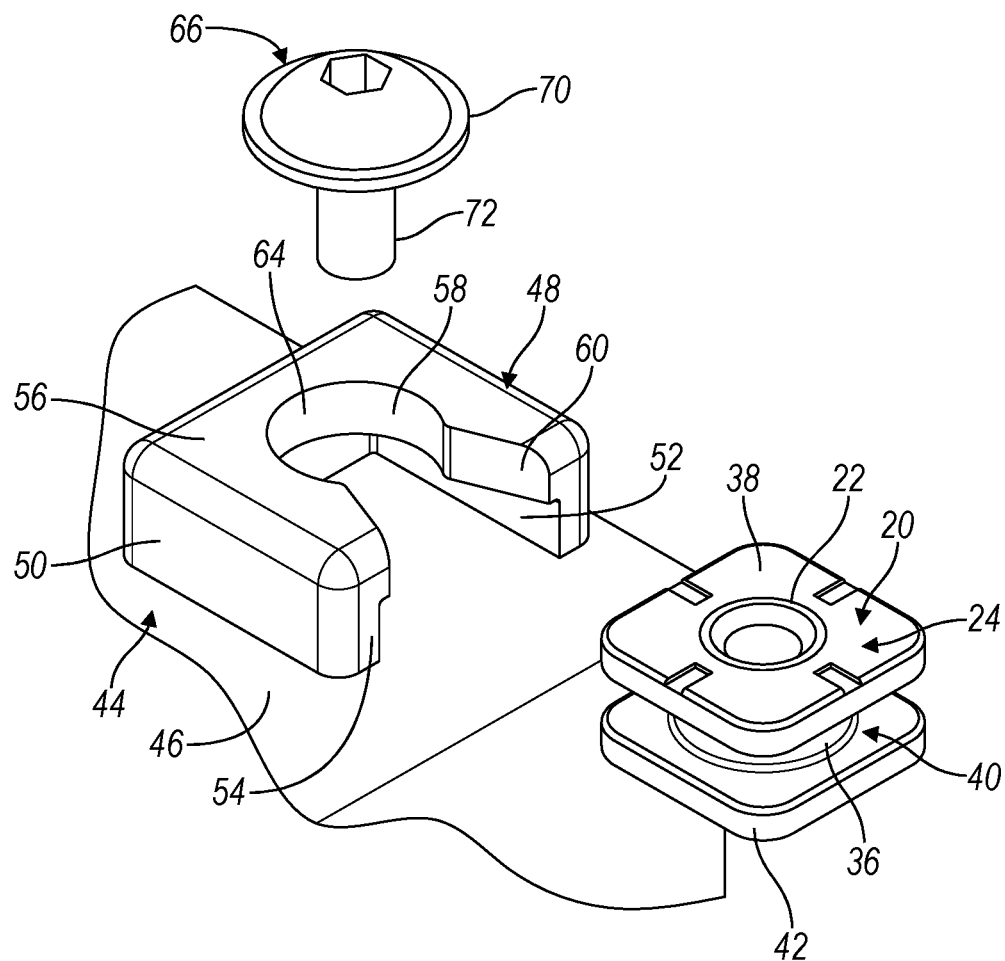
FIG. 5
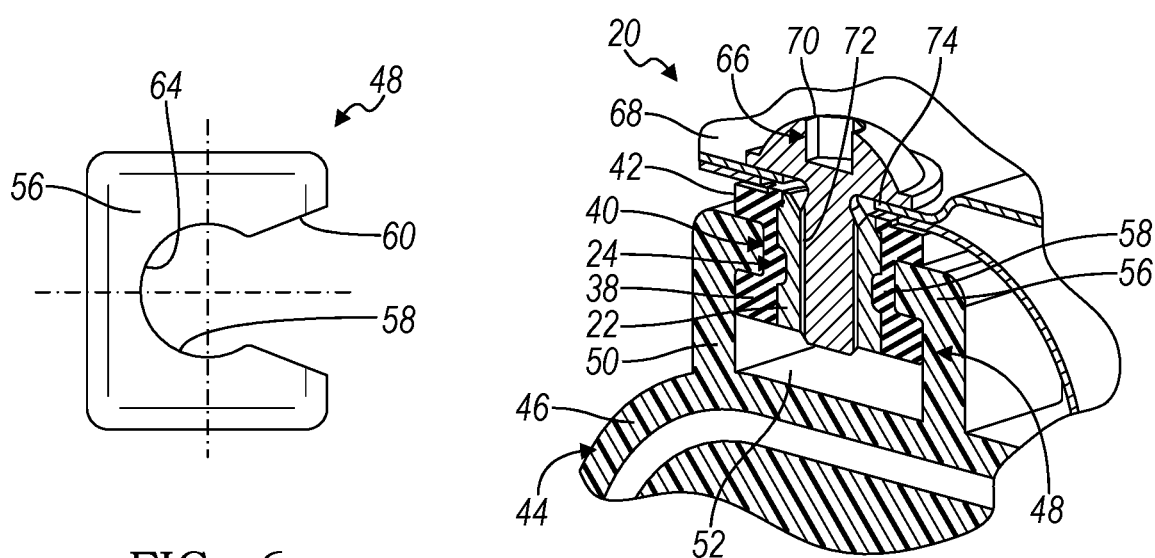
FIG. 6
FIG. 7

DAMPENED FASTENER ASSEMBLY

CROSS-REFERENCE TO RELATED APPLICATIONS

This application claims the priority to DE application Serial No. 20 2016 107 350.2, filed Dec. 23, 2016, the disclosure of which is hereby incorporated in its entirety by reference herein.

TECHNICAL FIELD

Various embodiments related to dampened fastener assemblies.

BACKGROUND

Various actuators generate vibrations such as compressors.

SUMMARY

According to at least one embodiment, a fastener assembly is provided with a first threaded fastener. A damper is formed of an elastomeric material and has a body sized to receive the first threaded fastener, and a flange to provide an installation surface. A second threaded fastener is sized to engage the first threaded fastener.

According to a further embodiment, the damper is formed from a polymeric material.

According to another further embodiment, the damper is formed from ethylene propylene diene terpolymer.

According to another further embodiment, the body is generally rectangular in cross section.

According to another further embodiment, the body is generally cylindrical.

According to another further embodiment, the flange is provided with at least one flat surface about a periphery thereof.

According to another further embodiment, the flange is generally rectangular.

According to another further embodiment, the flange is further defined as a first flange. The installation surface is further defined as a first installation surface. A second flange provides a second installation surface.

According to another further embodiment, the first threaded fastener further comprises a metallic internally threaded nut.

According to a further embodiment, the damper body is molded about the nut.

According to another further embodiment, the first threaded fastener includes an external body to limit rotation relative to the damper body.

According to a further embodiment, the first threaded fastener has a plurality of wrench flats formed about the body.

According to another further embodiment, the first threaded fastener includes an externally splined surface.

According to another further embodiment, the external body of the first fastener has a reduced width to limit axial translation of the first fastener relative to the damper.

According to a further embodiment, a dampened assembly is provided with an actuator with a housing. The fastener assembly is provided. A receptacle is provided on the housing of the actuator. The receptacle has a cavity sized to receive the flange of the damper, and the receptacle is provided with a slot with an opening to receive the body of the damper.

According to an even further embodiment, the cavity is sized to engage the flange and prevent rotation of the damper and first threaded assembly.

According to another further embodiment, the actuator further comprises a compressor.

According to another further embodiment, the slot has a first width sized to receive the body of the damper and a second width adjacent the opening that is smaller than the first width and smaller than a width of the body of the damper to retain the body of the damper within an enlarged width of the slot.

According to another further embodiment, a structural assembly is provided with a structural support member with an aperture formed therethrough. The dampened assembly is provided. The second threaded fastener is engaged with the aperture of the structural support member to fasten the dampened assembly to the structural support member.

According to a further embodiment, the structural support member includes a vehicle body member.

According to another further embodiment, the structural support member includes a vehicle seat frame.

According to another further embodiment, the second threaded fastener is provided with a bolt with a threaded shaft engaged with the first threaded fastener, and a fastener head. The aperture intersects an opening greater than the fastener head to permit the fastener head to pass therethrough, and to permit the threaded shaft to be translated into the aperture for blind assembly of the dampened assembly to the structural support member.

According to another embodiment, a fastener assembly is provided with a first threaded fastener. A damper with a body is sized to receive the first threaded fastener in a longitudinal direction of the damper body. A transverse recess is formed about the damper body. A second fastener is sized to engage the first threaded fastener.

According to another embodiment, a fastener assembly is provided with a first threaded fastener. A damper with a body is sized to receive the first threaded fastener. The body has a length in an axial direction of the first threaded fastener and a width generally perpendicular to the length. The body has a reduced width to engage an installation component. A second fastener is sized to engage the first threaded fastener.

BRIEF DESCRIPTION OF THE DRAWINGS

FIG. 5 is an exploded perspective view of a dampened assembly including the fastener assembly of FIG. 1 according to an embodiment;

FIG. 6 is a top plan view of a receptacle of the dampened assembly of FIG. 5;

FIG. 7 is a perspective section view of a structural assembly including the dampened assembly of FIG. 5 according to an embodiment;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
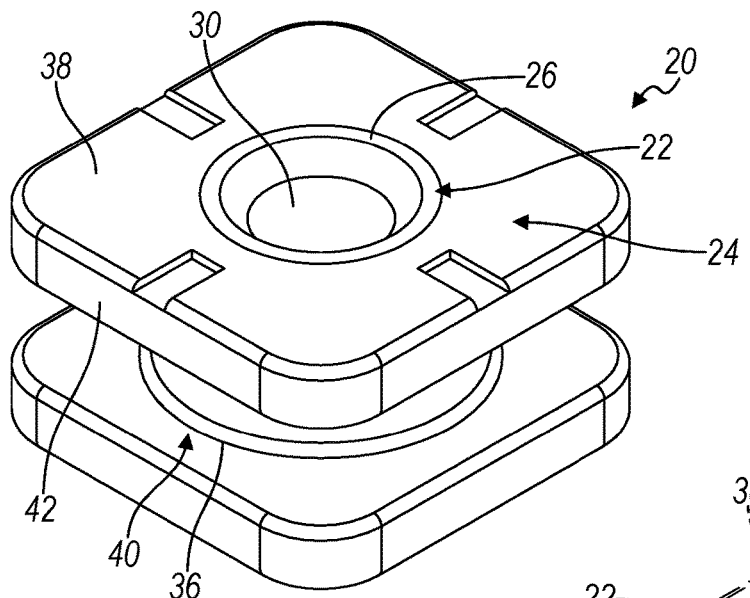
FIG. 1 is a perspective view of a fastener assembly according to an embodiment.
Figure 2:
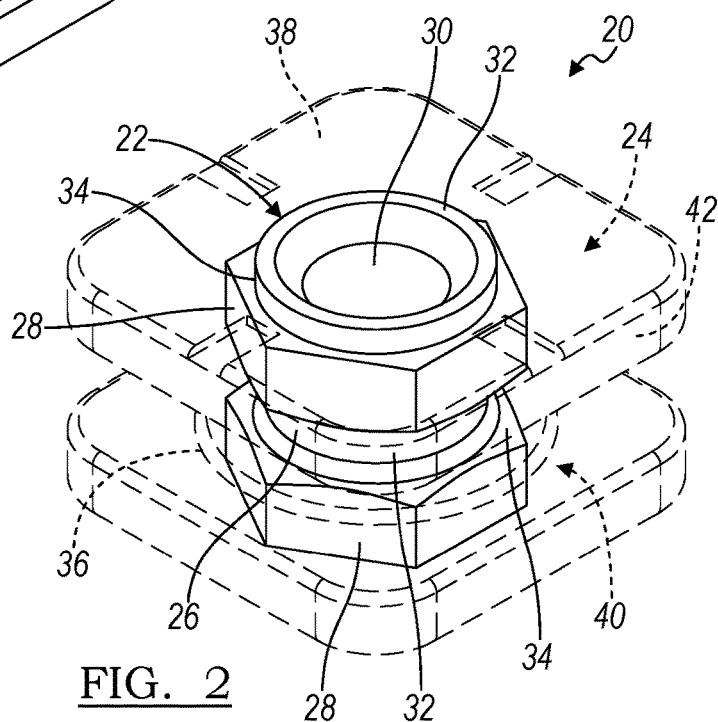
FIG. 2 is another perspective view of the fastener assembly of FIG. 1, wherein a damper of the fastener assembly is illustrated in phantom to illustrate a fastener.
Figure 3:
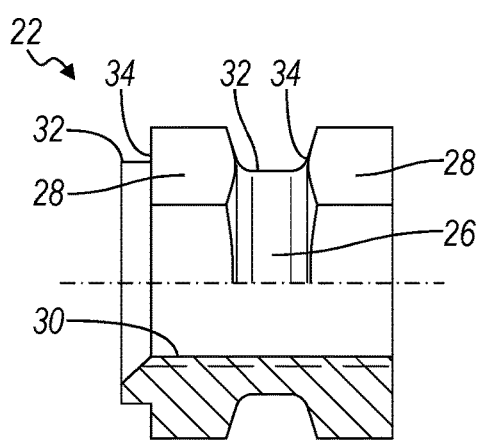
FIG. 3 is a partial section elevation view of the fastener of FIG. 2.
Figure 4:
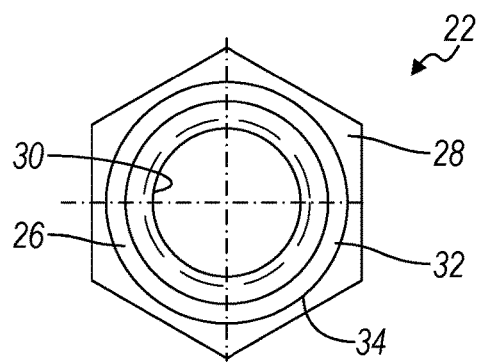
FIG. 4 is a top plan view of the fastener of FIG. 2.

FIGS. 1 and 2 illustrate a fastener assembly 20 according to an embodiment. The fastener assembly 20 is employed for dampening vibrations at a fastened connection. The fastener assembly 20 includes a first threaded fastener or bushing 22 with an external damper 24. The fastener assembly 20 decouples a direct contact between components, such as an actuator and a structural support member, to reduce structure-borne vibrations, and consequently noise.

With reference now to FIGS. 1-4, the bushing 22 includes a bushing body 26. The body 26 includes a pair of enlarged width portions formed as wrench flats 28 to prevent rotation of the bushing 22 relative to the damper 24. The wrench flats 28 are illustrated as a conventional hexagonal arrangement, however, any suitable shape is contemplated; and a parallelogram shape permits standardization of the bushing 22 and even load distribution within the damper 24. Alternatively, the body 26 may be formed with external splines or any suitable traction to limit rotation of the bushing 22 relative to the damper 24. The bushing 22 is formed from a metallic material; and the damper 24 is molded about the bushing 22 thereby engaging the body 26 and the wrench flats 28 for a secure connection between the damper 24 and the bushing 22.

The bushing body 26 has an internally threaded bore 30 to form a nut for receipt of a threaded shaft of a second fastener. The internally threaded bore 30 is a standard size and thread for utilizing standardized fasteners in cooperation with the fastener assembly 20. The bushing body 26 has a pair of regions 32 with a reduced width relative to the pair of wrench flat regions 28. The reduced width regions 32 provide retainer surfaces 34 adjacent the wrench flats 28 to distribute axial loading applied to the bushing 22 to the damper 24.

With reference again to FIGS. 1 and 2, the damper 24 is formed of a polymeric material, which may be molded over the bushing body 26. The damper 24 is formed from a material which is structurally adequate to support the associated fastening requirements, while sufficiently pliable to absorb and dissipate vibrations imparted to the damper 24, such as an elastomeric rubber. For example, the damper 24 may be formed from ethylene propylene diene terpolymer (EPDM) with a hardness selected for the particular application.

A solid connection between the threaded insert bushing 22 and the EPDM damper 24 enhances the effectiveness of the fastener assembly 20. The solid connection may be a non-releasable connection or a permanent joining of the materials. If a standardized threaded insert bushing 22 is employed, the bushing may not be prepared for an insert molding operation. In that instance, the insert bushing 22 may be degreased, sandblasted, cleaned, or the like, prior to the molding operation. The bushing 22 may be coated with a bonding material prior to the molding process.

The damper 24 includes a damper body 36 that is oriented axially with the bushing body 26, and is sized to receive the bushing body 26 therein. The damper body 36 is generally round and cylindrical. Alternatively, the damper body 36 may have a generally rectangular cross section. The damper 24 includes a pair of flanges 38 extending transversely from the damper body 36, which are spaced apart from one another and are provided on opposed distal ends of the damper body 36. The spacing of the flanges 38 collectively provide a transverse recess 40 about the damper body 36. The flanges 38 are sized and shaped to provide installation surfaces for the fastener assembly 20.

Each flange 38 is provided with a series of flat surfaces 42 formed about the periphery to provide engagement surfaces at installation. The flanges 38 are formed as generally rectangular, and according to the depicted embodiment, as squares with rounded corners for axial symmetry for flexibility of installation, while optimizing the surface area of the contact surfaces 42.

The fastener assembly 20 has a length which may be defined by a length of the bushing body 26. The length of the fastener assembly 20 is optimized for a compact fastener assembly 20. The flanges 38 are oriented transversely in a width direction for damping the fastener assembly 20 while optimizing the length, and consequently the compactness of the fastener assembly 20.

FIGS. 5-7 depict an installation component or actuator assembly 44 according to an embodiment. The actuator assembly 44 may be a compressor according to an embodiment, as compressors require secure dampened connections at installation. Although an actuator assembly 44 is illustrated and described, any fastened connection is contemplated wherein a direct connection between metallic components may distribute unwanted vibrations that may lead to noise and vibrational harshness and/or buzz, squeak or rattle. The actuator assembly 44 includes a housing 46, which may be formed from a structural polymeric material, metal stamping, or the like.

A receptacle 48 is mounted to the housing 46 for each fastener assembly 20 location. The receptacle 48 may be formed integrally with the housing 46. The receptacle 48 includes three intersecting sidewalls 50 aligned with right angles at the intersections to provide a cavity 52 accessible through an opening 54. A plate 56 is provided upon the receptacle 48 across the three sidewalls 50. The receptacle plate 56 also provides a boundary of the opening 54.

The receptacle plate 56 includes a blind slot 58 formed therein for receipt of the fastener assembly 20. The slot 58 has an enlarged width 60 to provide leading edges for receipt and alignment of the damper body 36 during installation. The cavity 52 is sized to receive one of the pair of flanges 38. The flat surfaces 42 of the flange 38 engage the three sidewalls 50 to prevent rotation of the damper 24 within the receptacle 48. The slot 58 tapers from the enlarged width 60 at the opening 54 to a narrow throat 62, before enlarging again to a blind depth 64. The throat 62 has a width less than a diameter of the damper body 36 to require deformation of the damper body 36 during installation, and to consequently retain the damper 24 once installed.

After the damper 24 is installed in the receptacle 48, a second threaded fastener or bolt 66 is employed to fasten the actuator assembly 44 to a structural support member 68 (FIG. 7). Referring now to FIGS. 5 and 7, the bolt 66 includes a bolt head 70 and a threaded shaft 72. For assembly of the actuator assembly 44 to the structural support member 68, the receptacle 48 is aligned with an aperture 74 in the structural support member 68. Then, the bolt 66 is inserted through the aperture 74 at an opposite side of the structural support member 68, and the bolt 66 is fastened in threaded engagement with the bushing 22. Fastener tension upon the bolt 66 and the bushing 22 places the damper body 36 under compression, thereby further resisting any lateral deformation that would permit disassembly of the damper 24 from the receptacle 48.

The flange 38 of the fastener assembly 20 that is outside of the receptacle 48 provides a damped buffer between the actuator assembly 44 and the structural support member 68 to prevent direct contact between these two fastened components.

The fastener assembly 20 provides ease in assembly and reduces complexity in manufacturing. The radial symmetry of the fastener assembly 20 permits installation into the receptacle at various orientations thereby permitting flexibility at assembly. By retaining one end, or the damper 24 and the bushing 22 within the receptacle 48, blind installation of the bolt 66 is permitted without requiring a tool applied to the receiving end or bushing 22 of the fastener assembly 20.

Figure 8:
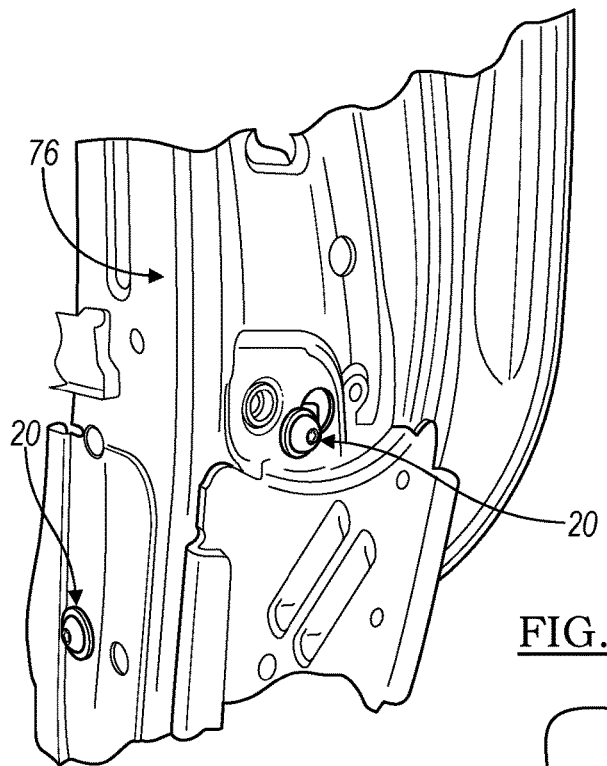
FIG. 8 is a perspective view of a structural assembly including the dampened assembly of FIG. 5 according to another embodiment.
Figure 9:
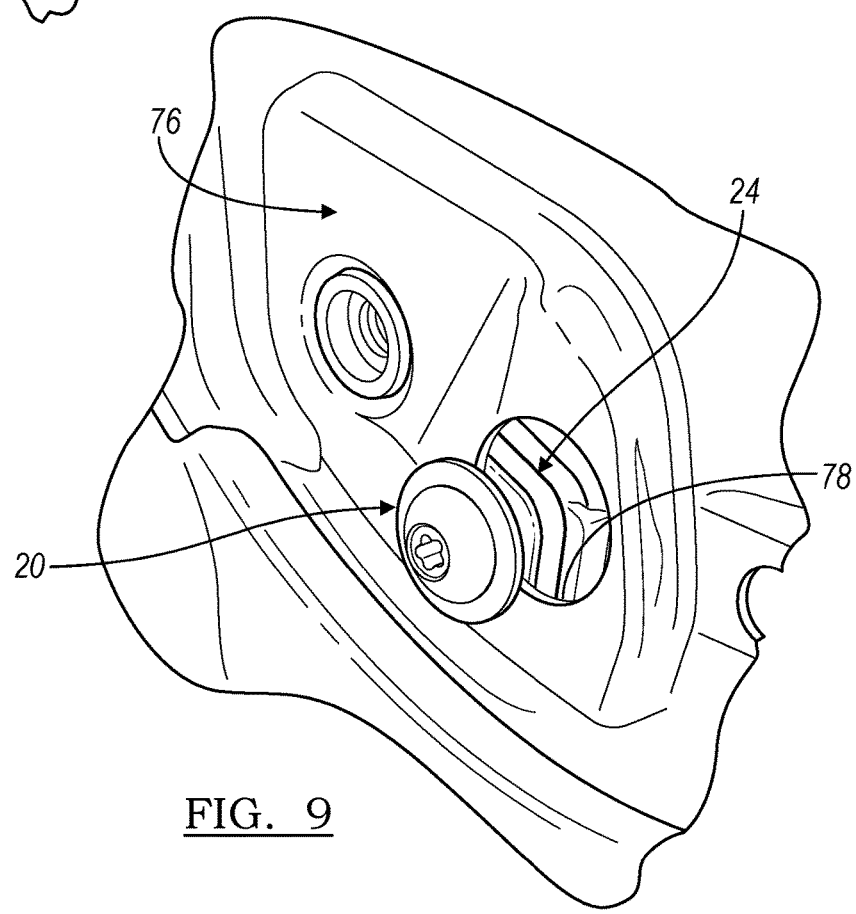
FIG. 9 is an enlarged perspective view of a region of the structural assembly of FIG. 8.

FIGS. 8 and 9 illustrate a structural support member 76 according to another embodiment. According to one embodiment, the structural support member is a structural support of a vehicle body member. Vehicle bodies are structural support members that experience various vibrations, may employ actuator assemblies, wherein vibrationally damped hardware and compactness are significant design concerns. Further, as depicted, the structural support member 76 may be frame component of a vehicle seat.

FIG. 8 illustrates a pair of fastener assemblies 20 which may collectively provide dampened fastening of a common component to the vehicle seat frame 76. The common component is a compressor 44 for inflating air bladders in a seat assembly according to one embodiment. For this particular application, the dampened fastener assemblies 20 minimize the distribution of vibrations from the compressor 44 to the vehicle seat frame 76 thereby optimizing tactile and audible comfort of associated passengers.

With reference to FIG. 9, the vehicle seat frame 76 includes an enlarged aperture 78 intersecting the aperture 74. The enlarged aperture 78 has a diameter greater than the bolt head 70. The enlarged aperture 78 permits the bolt 66 to be partially installed in the bushing 22 prior to assembly of the actuator assembly 44 to the structural support member 68. The bolt head 70 is aligned and inserted through the enlarged aperture 78. The actuator assembly 44 is translated into position, whereby the bolt shaft 72 passes from the enlarged aperture 78 into the aperture 74. Then the bolt 66 is tightened, thereby fastening the actuator assembly 44 to the vehicle seat frame 76.

Figure 10:
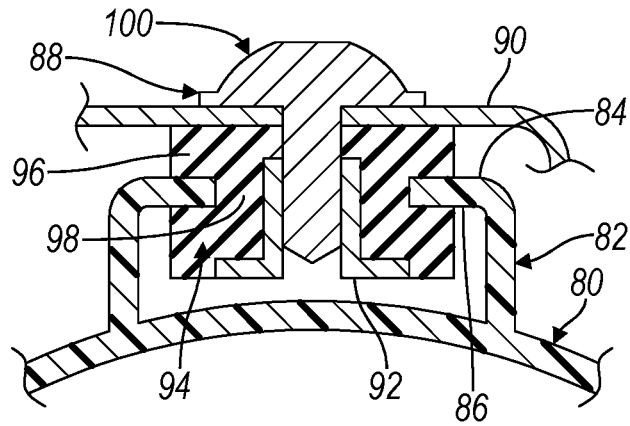
FIG. 10 is an axial section view of a structural assembly including a dampened assembly according to an embodiment.

FIG. 10 illustrates an actuator assembly 80 according to another embodiment. The actuator assembly 80 includes a receptacle 82 with a slot 84 and a cavity 86, similar to the prior embodiments. A fastener assembly 88 is installed in the slot 84 for connecting the actuator assembly 80 to a structural support member 90. The fastener assembly 88 includes an internally threaded bushing 92 with an external damper 94. The damper 94 includes a pair of flanges 96 with a recess 98 therebetween. A bolt 100 fastens the bushing 92 of the fastener assembly 88 to the structural support member 90.

Figure 11:
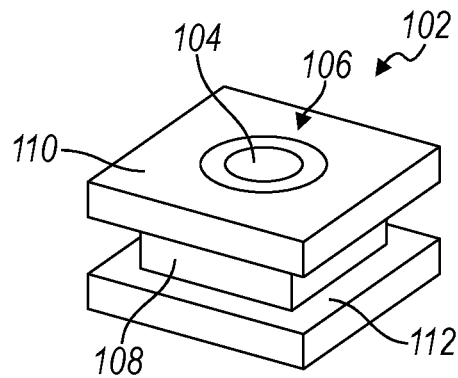
FIG. 11 is a perspective view of a fastener assembly according to an embodiment.

FIG. 11 depicts a fastener assembly 102 according to another embodiment. The fastener assembly 102 includes an internally threaded bushing 104 with an external damper 106. The damper 106 includes a damper body 108 that is oriented axially with the bushing 104, and is sized to receive the bushing 104 therein. The damper body 108 is generally rectangular in cross section. The damper 106 includes a pair of flanges 110 extending transversely from the damper body 108, which are spaced apart from one another and are provided on opposed distal ends of the damper body 108. The spacing of the flanges 108 collectively provide a transverse recess 112 about the damper body 108.

Figure 12:
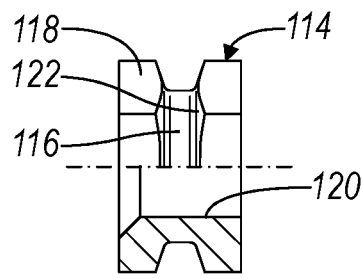
FIG. 12 is a partial section elevation view of a fastener according to another embodiment.
Figure 13:
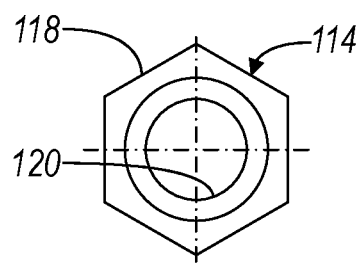
FIG. 13 is a top plan view of the fastener of FIG. 12.

FIGS. 12 and 13 illustrate a bushing 114 according to another embodiment. The bushing 114 includes a bushing body 116. The bushing body 116 includes a pair of wrench flat portions 118. The bushing body 116 has an internally threaded bore 120 to form a nut for receipt of a threaded shaft of a second fastener. The bushing body 116 has a reduced width relative to the pair of wrench flat regions 118. The reduced width region of the bushing body 116 provides retainer surfaces 122 adjacent the wrench flat portions 118 to distribute axial loading applied to the bushing 114 to the associated damper. The bushing 114 provides an alternative to the bushing 22 of the prior embodiment, wherein a shortened bushing 114 and consequently a shortened fastener assembly is offered for a more compact application, and/or for an application with a lower tensile load.

Figure 14:
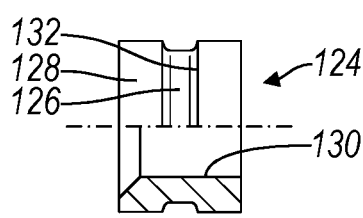
FIG. 14 is a partial section elevation view of a fastener according to another embodiment.
Figure 15:
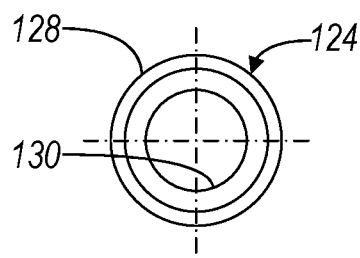
FIG. 15 is a top plan view of the fastener of FIG. 14.

FIGS. 14 and 15 illustrate a bushing 124 according to another embodiment. The bushing 124 includes a bushing body 126. The bushing body 126 includes a pair of enlarged diameter portions 128. The enlarged diameter portions 128 have an external spline formed therein to enhance contact and engagement with the damper. The bushing body 126 has an internally threaded bore 130 to form a nut for receipt of a threaded shaft of a second fastener. The bushing body 126 has a reduced width relative to the pair of enlarged regions 128. The reduced width region of the bushing body 126 provides retainer surfaces 132 adjacent the splined portions 128 to distribute axial loading applied to the bushing 124 to the associated damper. The bushing 124 provides an alternative to the prior embodiments, wherein a shortened bushing 124 with a reduced overall width, permits a shortened fastener assembly and thinner fastener assembly for an even more compact application with a lower applicable torque.

Figure 16:
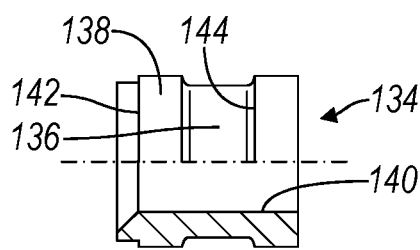
FIG. 16 is a partial section elevation view of a fastener according to another embodiment.
Figure 17:
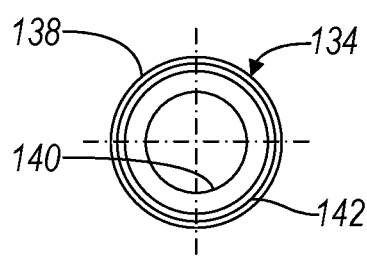
FIG. 17 is a top plan view of the fastener of FIG. 16.

FIGS. 16 and 17 illustrate a bushing 134 according to another embodiment. The bushing 134 includes a bushing body 136. The bushing body 136 includes a pair of enlarged diameter portions 138. The enlarged diameter portions 138 have an external spline formed therein to enhance contact and engagement with the damper. The bushing body 136 has an internally threaded bore 140 to form a nut for receipt of a threaded shaft of a second fastener. The bushing body 136 has a pair of regions 142 with a reduced width relative to the pair of enlarged regions 138. The reduced width regions 142 of the bushing body 136 provide retainer surfaces 144 adjacent the splined portions 138 to distribute axial loading applied to the bushing 134 to the associated damper. The bushing 134 provides an alternative to the prior embodiments, by providing a lengthened bushing 134 with a reduced overall width, to permit an application of a greater tensile load with a lower applicable torque.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A fastener assembly comprising:
   a first threaded fastener having a pair of enlarged width portions configured to prevent rotation, a pair of regions with reduced width relative to the enlarged width portions each having a retainer surface;
   a damper formed of an elastomeric material and comprising:
   a body sized to receive the first threaded fastener, and
   a flange to provide an installation surface; and
   a second threaded fastener sized to engage the first threaded fastener.

2. The fastener assembly of claim 1 wherein the damper is formed from a polymeric material.

3. The fastener assembly of claim 1 wherein the damper is formed from ethylene propylene diene terpolymer.

4. The fastener assembly of claim 1 wherein the body is generally cylindrical.

5. The fastener assembly of claim 1 wherein the flange is provided with at least one flat surface about a periphery of the flange.

6. The fastener assembly of claim 1 wherein the flange is generally rectangular.

7. The fastener assembly of claim 1 wherein the flange is further defined as a first flange;
   wherein the installation surface is further defined as a first installation surface; and
   wherein the fastener assembly further comprises a second flange to provide a second installation surface.

8. The fastener assembly of claim 1 wherein the first threaded fastener further comprises a metallic internally threaded nut.

9. The fastener assembly of claim 8 wherein the damper body is molded about the nut.

10. The fastener assembly of claim 8 wherein the first threaded fastener comprises an external body to limit rotation relative to the damper body.

11. The fastener assembly of claim 10 wherein the external body of the first fastener has a reduced width to limit axial translation of the first fastener relative to the damper.

12. A dampened assembly comprising:
    an actuator with a housing;
    a fastener assembly according to claim 1; and
    a receptacle provided on the housing of the actuator, the receptacle having a cavity sized to receive the flange of the damper, and the receptacle is provided with a slot with an opening to receive the body of the damper.

13. The dampened assembly of claim 12 wherein the cavity is sized to engage the flange and prevent rotation of the damper and first threaded assembly.

14. The dampened assembly of claim 12 wherein the actuator further comprises a compressor.

15. The dampened assembly of claim 12 wherein the slot has a first width sized to receive the body of the damper and a second width adjacent the opening that is smaller than the first width and smaller than a width of the body of the damper to retain the body of the damper within an enlarged width of the slot.

16. A structural assembly comprising:
    a structural support member with an aperture formed therethrough; and
    a dampened assembly according to claim 12, wherein the second threaded fastener is engaged with the aperture of the structural support member to fasten the dampened assembly to the structural support member.

17. The structural assembly of claim 16 wherein the structural support member comprises a vehicle seat frame.

18. The structural assembly of claim 16 wherein the second threaded fastener comprises a bolt with a threaded shaft engaged with the first threaded fastener, and a fastener head; and
    wherein the aperture intersects an opening greater than the fastener head to permit the fastener head to pass therethrough, and to permit the threaded shaft to be translated into the aperture for blind assembly of the dampened assembly to the structural support member.

19. A fastener assembly comprising:
    a first threaded fastener having a pair of enlarged width portions configured to prevent rotation, a pair of regions with reduced width relative to the enlarged width portions each having a retainer surface;
    a damper with a body sized to receive the first threaded fastener in a longitudinal direction of the damper body, wherein a transverse recess is formed about the damper body; and
    a second fastener sized to engage the first threaded fastener; and
    wherein the first threaded fastener further comprises a metallic internally threaded nut.

20. A fastener assembly comprising:
    a first threaded fastener having a pair of enlarged width portions configured to prevent rotation, a pair of regions with reduced width relative to the enlarged width portions each having a retainer surface;
    a damper with a body sized to receive the first threaded fastener, the body having a length in an axial direction of the first threaded fastener and a width generally perpendicular to the length, wherein the body has a reduced width to engage an installation component; and
    a second fastener sized to engage the first threaded fastener; and
    wherein the first threaded fastener further comprises a metallic internally threaded nut.

* * * * *